United States Patent [19]
Sotom

[11] Patent Number: 5,570,218
[45] Date of Patent: Oct. 29, 1996

[54] OPTICAL SWITCHING MATRIX

[75] Inventor: Michel Sotom, Paris, France

[73] Assignee: Alcatel N.V., Rijswijik, Netherlands

[21] Appl. No.: 518,300

[22] Filed: Aug. 23, 1995

[30] Foreign Application Priority Data

Aug. 29, 1994 [FR] France .................................. 94 10367

[51] Int. Cl.$^6$ .............................. H04J 14/00; H04B 10/20
[52] U.S. Cl. ........................ 359/117; 359/134; 359/160; 359/179; 385/17
[58] Field of Search ..................... 359/117, 120, 359/121, 128, 134, 160, 176, 178, 179, 173, 341; 385/17

[56] References Cited

U.S. PATENT DOCUMENTS

| | | | |
|---|---|---|---|
| 4,778,238 | 10/1988 | Hicks | 359/341 |
| 5,355,248 | 10/1994 | Hadjifotiou | 359/341 |
| 5,392,377 | 2/1995 | Auracher | 359/179 |

FOREIGN PATENT DOCUMENTS

| | | | |
|---|---|---|---|
| 0474426A2 | 3/1992 | European Pat. Off. | G02B 6/28 |
| 0503849A2 | 9/1992 | European Pat. Off. | H04Q 3/52 |

OTHER PUBLICATIONS

Photonic Switching II, Proceedings Of The International Topical Meeting, vol. 29, 12–14 Apr., 1990, Kobe, Japan, pp. 122–125, XP 000333141, Y. Sato et al, "An Erbium-–Doped Fiber Active Switch Controlled by Coded Pump Light".

Patent Abstracts Of Japan, vol. 18, No. 447 (E–1594), 19 Aug. 1994 & JP–A–06 140702 (Fujitsu) "Optical Amplification star–coupler".

*Primary Examiner*—Wellington Chin
*Assistant Examiner*—Rafael Bacares
*Attorney, Agent, or Firm*—Sughrue, Mion, Zinn, Macpeak & Seas

[57] ABSTRACT

In an optical switching matrix, a common waveguide and a plurality of individual waveguides are connected by a selector that connects the common waveguide to a selected individual waveguide. The individual waveguides are doped and light from a pump is injected into the common waveguide towards the selector. The selector selectively transmits this light to the selected individual waveguide. The resulting amplification in this waveguide reduces crosstalk. One application of these optical switching matrices is in fiber optic telecommunication networks.

5 Claims, 2 Drawing Sheets

OPTICAL SWITCHING MATRIX

BACKGROUND OF THE INVENTION

1. Field of the Invention

The present invention concerns space switching of optical signals, as used in for example in a fiber optic telecommunication network.

2. Description of the Prior Art

The nodes of these networks include space switching devices comprising passive distributors and active selectors. One to n passive distributors each supplies on one output only a fraction 1/n of the power of the signal received at its input. Also, each active selector introduces losses. For this reason a device of this type conventionally includes doped fiber amplifiers. This type of amplifier includes a doped optical fiber for guiding optical signals to be transmitted. It also includes pump means injecting pump light into the fiber in order to amplify the signals and thereby compensate the power losses mentioned above. The present invention is more generally concerned with the situation in which the amplifier device is not necessarily an optical fiber but is pumped optically.

For example, another major problem in switching matrices using these selectors is crosstalk between active selectors. An active selector can switch signals by connecting an optical waveguide, referred to hereinafter as the "common guide" with respect to this selector and these signals, to an individual guide selected from a plurality of individual guides that can be connected to the common guide. It transmits signals from the individual guides to the common guide or from the common guide to the individual guide. For example, the crosstalk can be expressed in a simplified manner by a coefficient r such that, if power WA is received on the common guide and transmitted by the selected guide, unwanted power r.WA is transmitted by each of the other individual guides or, if power WB is received at an unselected individual guide, unwanted power r.WB is transmitted by the common guide.

A first prior art switching matrix includes arrangements to reduce the crosstalk coefficient.

It is described in the article: PHOTONIC SWITCHING II, PROCEEDINGS OF THE INTERNATIONAL TOPICAL MEETING, vol. 29, 12 Apr. 1990–14 Apr. 1990 KOBE, JAPAN, pages 122–125, XP 000333141 Y. SATO ET AL "An Erbium-Doped Fiber Active Switch Controled by Coded Pump Light". It includes a plurality of doped fiber amplifiers distributed over various guided paths that the signals to be switched can take. A plurality of switchable feed waveguides convey respective pump waves to the amplifiers in order to energize them, i.e. to effect the optical pumping of their doped fibers.

An optical decoder receives this wave on its input side to transmit it to the waveguides. In accordance with coding of the wave, it feeds selectively at all times those amplifiers on the path selected at that time. As a result the signals on the selected paths are amplified and the other signals are absorbed by the amplifiers that are not energized.

This first prior art matrix is complex.

An object of the present invention is to provide a simple optical switching matrix having a low crosstalk coefficient.

SUMMARY OF THE INVENTION

The present invention is directed to an optical switching matrix including:

a plurality of input waveguides, a plurality of output waveguides, a plurality of selectors each having at least three ports and being adapted to assume a selected one of a plurality of possible states, each possible state being associated with at least one pair of said ports, said selected state optically interconnecting the two ports of each of said pairs of ports associated with said selected state, a plurality of intermediate waveguides forming with said selectors for optical signals to be switched a plurality of possible paths each connecting one input waveguide to one output waveguide via at least one intermediate waveguide and at least one pair of ports of a selector, optically pumped amplifiers each in series with an intermediate waveguide to amplify said optical signals transmitted by said waveguide, there being at least one such amplifier on each of said possible paths, pumps injecting pump light into said input, intermediate and/or output waveguides to pump said amplifiers via said selectors of the same selected paths as said optical signals, each selector conveying pump light from a pump constituting a selector switching the light from said pump and said pump constituting a light pump switched by said selector if there is no amplifier between said pump and said selector, in which switching matrix at least one selector switching light from a pump constitutes a single pump input selector, said ports of this selector constituting a common port and a plurality of individual ports, each of said possible states of said selector being associated with at least one of said individual ports of said selector, said selected state of said selector connecting said common port to each of said individual ports associated with said selected state, each of said light pumps switched by said selector being connected to said selector by said common port.

The advantage of the present invention stems from the fact that a wanted fraction of each optical signal is amplified more than unwanted fractions of the same signal or other optical signals. This fraction of the unwanted signal is that passing through the selected individual port. This individual port is connected to a waveguide constituting an individual waveguide for the selector in question and incorporating an amplifier. For this fraction of the signal the amplifier has a high gain by virtue of the presence of a large wanted fraction of the pump light. The unwanted fractions of the optical signals are those guided by the other individual waveguides connected to the other individual ports of the selector. They are amplified with a gain that is small because only small unwanted fractions of the pump light are injected into these other waveguides.

The matrix of the present invention has a feature it shares with a second prior art matrix described in patent EP-A-0 503 849 (ATT). This common feature is that, in some selectors between pumps and particularly pump amplifiers, the pump waves follow the same selected paths as the signals to be switched. However, in this second prior art matrix each such selector has a plurality of ports adapted to receive the pump light. These ports are connected in a known way to respective pumps and therefore in this matrix this common feature would appear to have neither the intention nor the effect of reducing the crosstalk coefficient.

How the present invention may be put into effect is described hereinafter with reference to the appended diagrammatic drawings. If a component is shown in more than one figure it is always denoted by the same reference symbol.

The figures show optical switching matrices.

DETAILED DESCRIPTION OF THE INVENTION

Considering a single selector, a matrix of the present invention includes the following components:

Waveguides to guide optical signals. Some of these waveguides D are doped to constitute amplifiers. Each doped waveguide amplifies a signal when it is simultaneously guiding the signal and the light from a pump P. These waveguides comprise:
a common waveguide Bk,
a plurality of individual waveguides F1k ... Fik ... Fmk.

A selector Ck that has a common port and a plurality of individual ports respectively connected to the common waveguide and to the plurality of individual waveguides. It receives a control signal and, via the ports, connects the common waveguide Bk through at least one individual waveguide Fik selected by the control signal. The connection is such that the selector selectively transmits optical signals between the common waveguide and the selected individual waveguide.

A pump P supplying the pump light and injecting it into the doped waveguides D.

The individual waveguides are doped. For example, they are doped over only parts of their length by integrating a previously doped waveguide D into each of them in series with an undoped waveguide. Such composite waveguides are shown at F1k, D ... Fik, D ... Fmk, D. The pump P injects the pump light into the common waveguide Bk towards the selector Ck by means of an injection coupler Q. The selector is adapted to transmit the pump light from the common waveguide to the selected individual waveguide Fik, D in the same selective manner as for the optical signals.

Figure 1:
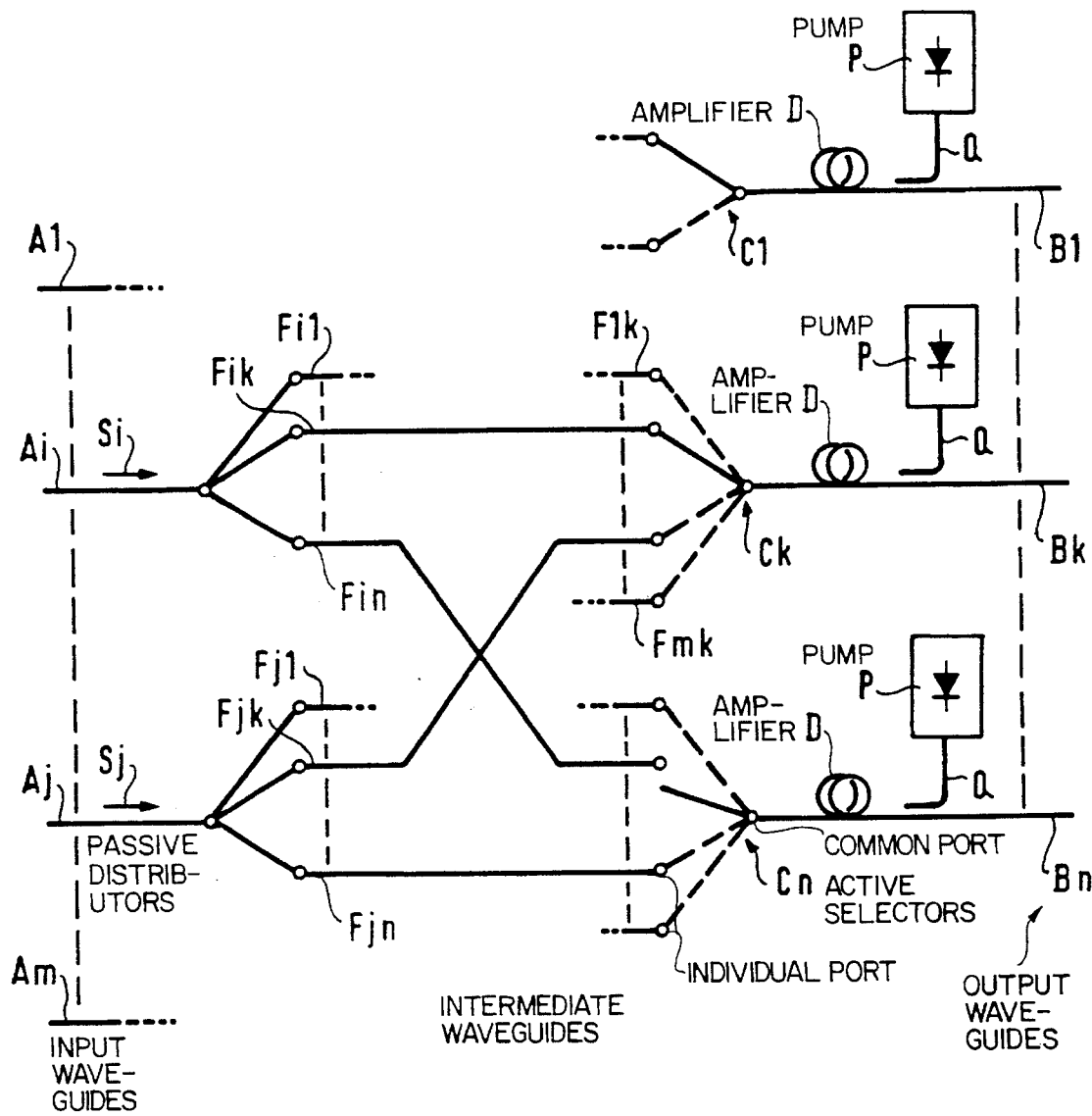
FIG. 1 shows a prior art matrix with amplification.
Figure 2:
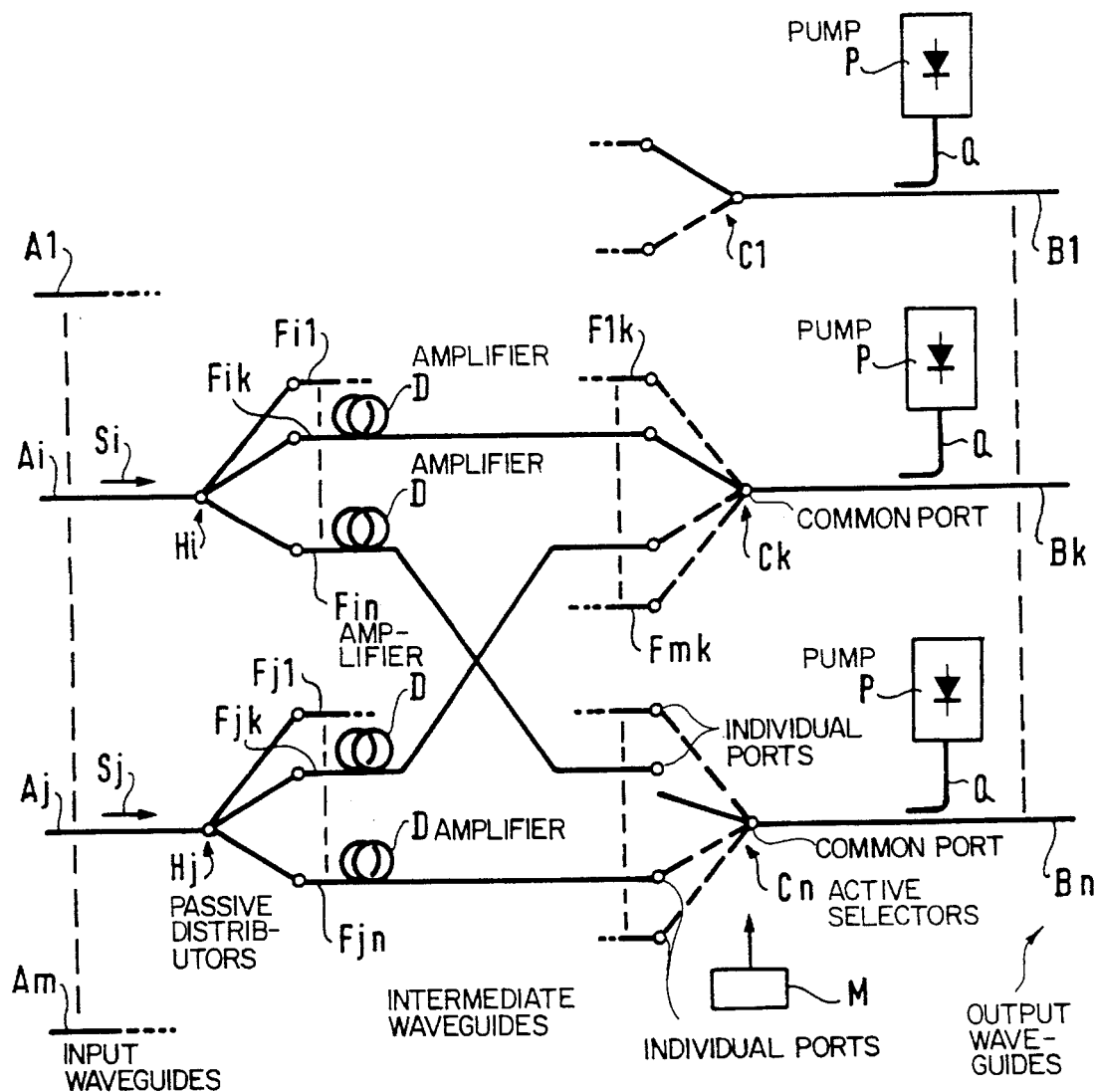
FIG. 2 shows a matrix implementing the present invention.

FIGS. 1 and 2 each show by way of non-limiting example a more complex m×n switching matrix. This matrix includes m 1 to n passive distributors Hi and Hj at the input, for example, and n active m to 1 selectors $C_1$ ... $C_n$ at the output. The numbers m and n are positive integers. To simplify the diagram only two distributors and two selectors are shown, but they are shown relatively complete. The selectors are controlled by a control unit M.

The components of each matrix are identical to the same name components of the other matrix. The passive distributors each have at their input a respective input waveguide A1 ... Ai ... Aj ... Am constituting a common waveguide for that distributor, the reference letters for the common waveguide also denoting the distributor. Each distributor Ai has at its output n individual waveguides Fi1 ... Fik ... Fin.

The active selectors C1 ... Ck ... Cn each have at their output a respective output waveguide B1 ... Bk ... Bn constituting a common waveguide for that selector.

Each selector Ck has at its input m individual waveguides F1k ... Fik ... Fjk ... Fmk.

The total number of individual waveguides is m.n and each individual waveguide is common to a distributor and to a selector. They constitute the intermediate waveguides previously mentioned.

Amplifiers are energized by pumps P and each has a directional injection coupler Q. Each amplifier comprises a doped waveguide D. The n output waveguides B1 ... Bk ... Bn have n pumps P. The injection couplers direct the pump light to the selectors. The input waveguides Ai and Aj receive m input signals Si and Sj at powers Pi and Pj, respectively. The selector Ck is controlled in such a way that a fraction 1/n of the power of the signal Si is routed to the output waveguide Bk.

An approximate value for the reduction in crosstalk by the present invention will now be calculated using simplifying hypotheses.

Each amplifier is adapted to amplify the signals that it guides with a gain G if the amplifier receives at the same time as the signals to be amplified all of the power of the light from a pump P. If it receives only a fraction y (e.g. 0.1 or 0.01) of this power it amplifies the signals with a reduced gain of approximately G.y.

The output power of the signal Si in the waveguide Bk is then approximately Pk=Pi.G/n.

Crosstalk in the selector Ck is expressed by a coefficient r which is the same for the signals to be transmitted and the pump light. The power of the input signals Sj other than Si is an unwanted input power and has a total value PTE.

In the prior art matrix of FIG. 1, n doped waveguides D are connected to n respective output waveguides B1 ... Bk ... Bn between the pumps and the selectors.

In the matrix of the invention shown in FIG. 2 there are no doped waveguides connected to the output waveguides and m.n doped waveguides D are respectively integrated with the m.n individual waveguides.

In the prior art matrix unwanted signals injected as a result of crosstalk into the output waveguide Bk are all amplified by a gain G and have in the waveguide Bk a total unwanted output power of approximately PTS1=PTE.G.r/n.

In the FIG. 2 matrix these unwanted signals are amplified with a reduced gain G.r and the total unwanted output power is approximately PTS2=PTE.G.$r^2$/n. The present invention has therefore reduced the unwanted power, i.e. the crosstalk, by a factor r of, for example, 1/10 or 1/100.

Without departing from the scope of the invention, the passive distributors Hi and Hj could be replaced with active selectors and the pumps P could then be placed on the input waveguides $A_1$ ... $A_m$.

There is claimed:

1. An optical switching matrix comprising:
    an optical waveguide including:
        a plurality of input waveguides,
        a plurality of output waveguides, and
        a plurality of intermediate waveguides;
    a plurality of selectors, each including at least three ports and having a plurality of possible states, each state being associated with at least one pair of said ports and being operative to be selected for optically mutually connecting two ports associated with said selected state, said selectors being operative to switch optical signals between a plurality of possible paths connecting one of said input waveguides to one of said output waveguides via at least one of said intermediate waveguides and at least one of said pair of ports of a selector, at least one of said selectors constituting a Y-shaped selector having a common port and at least two individual ports constituting said at least three ports, each of said pair of ports of said Y-shaped selector including said common port and a respective one of said individual ports;
    an optically pumped amplifier disposed on said intermediate waveguide in each of said plurality of possible paths; and a plurality of pumping trees, each having one truck, at least two branches and a pump disposed on said trunk for injecting pump lights and for pumping at least two of said amplifiers, wherein said common port of said Y-shaped selector is on said trunk for receiving a pump light from said pump and said at least two individual ports thereof are respectively disposed on said at least two branches, one of the individual ports returning the pump light according to the selected state of said Y-shaped selector, and wherein said at least two amplifiers on said at least two branches receive pump light solely from said at least two individual ports, respectively.

2. An optical switching matrix according to claim 1, wherein possible configurations of said matrix are each constituted by a set of said possible states of respective selectors and each of said possible configurations selects for each of said input waveguides a path connecting an input waveguide to one of said output waveguides and also selects for each of said output waveguides a path connecting that output waveguide to one of said input waveguides.

3. An optical switching matrix according to claim 1, wherein each of said pumps is included in a said pumping tree.

4. An optical switching matrix according to claim 1, wherein said pumps inject said pump light into said input waveguides and/or said output waveguides.

5. An optical switching matrix according to claim 1, further comprising control means for controlling said selectors without controlling said pumps.

\* \* \* \* \*